Feb. 25, 1936.    J. L. ANDERSON    2,031,583
TORCH FOR WELDING SEAMS ALONG CURVING SURFACES
Original Filed Aug. 1, 1931    2 Sheets-Sheet 1
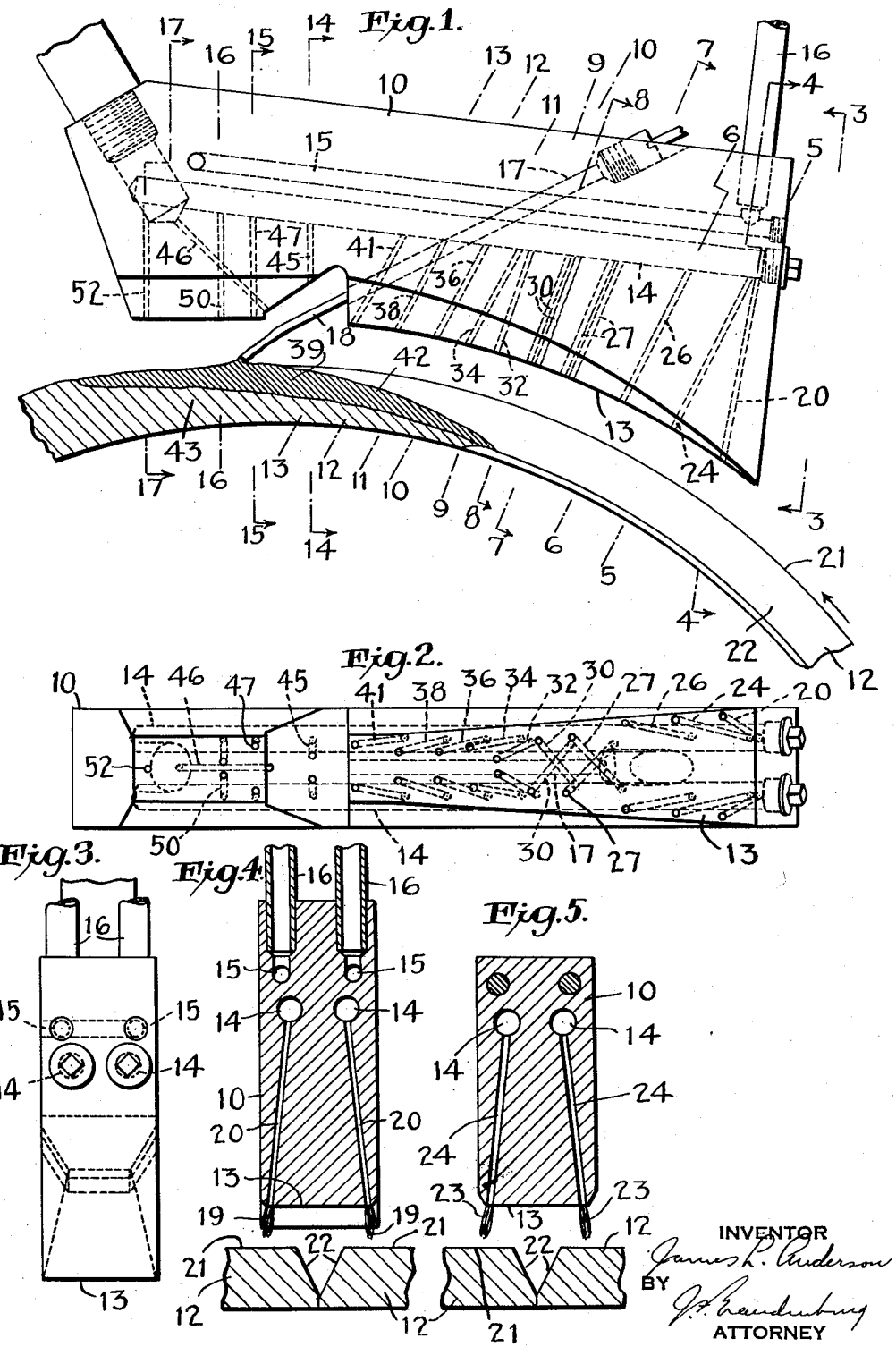

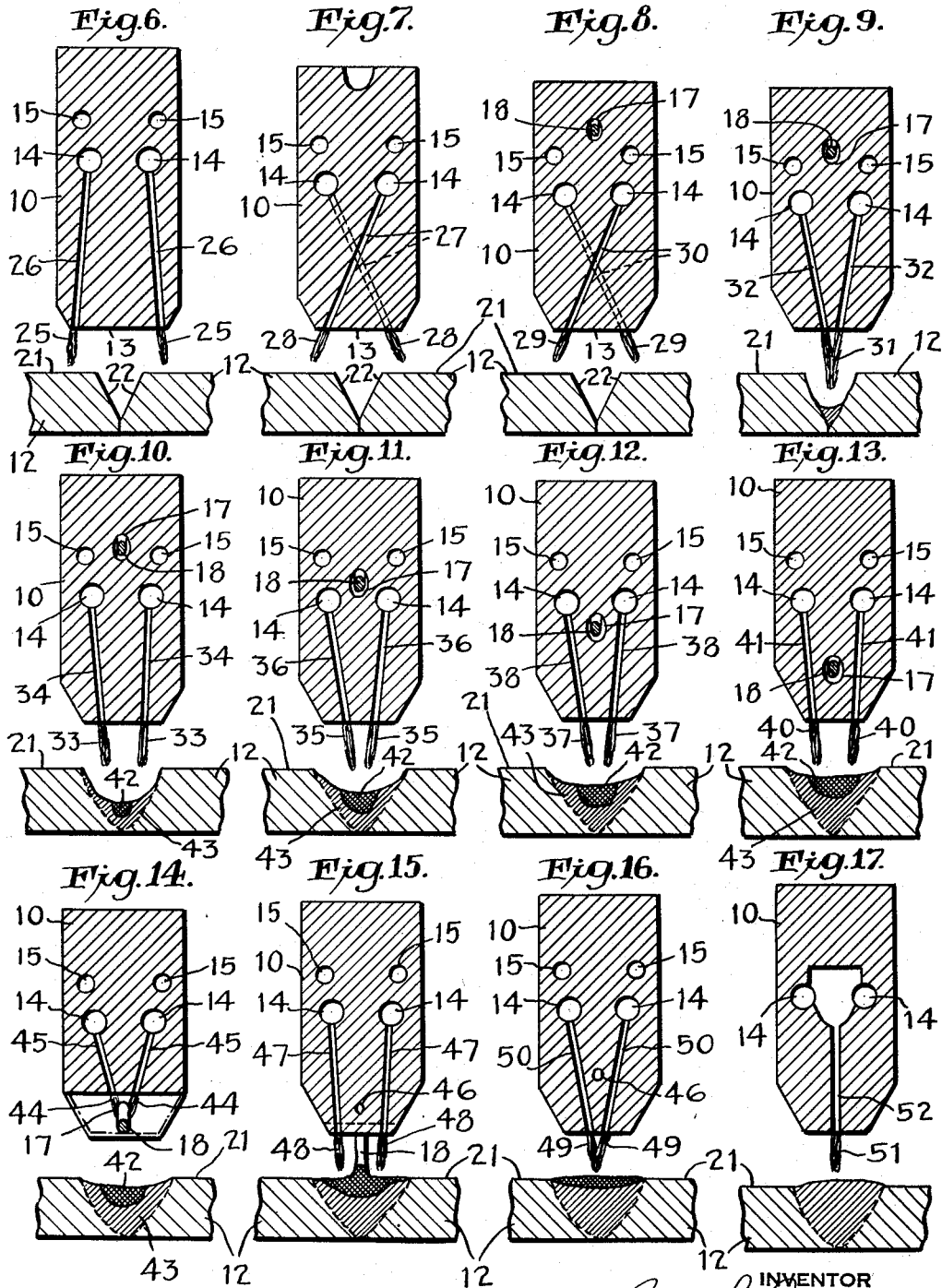

Patented Feb. 25, 1936

2,031,583

UNITED STATES PATENT OFFICE

2,031,583

TORCH FOR WELDING SEAMS ALONG CURVING SURFACES

James L. Anderson, Closter, N. J., assignor to Air Reduction Company, Incorporated, New York, N. Y., a corporation of New York Original application August 1, 1931, Serial No. 554,459. Patent No. 1,972,509, dated September 4, 1934. Divided and this application November 17, 1932, Serial No. 643,069

8 Claims. (Cl. 158—27.4)

The invention relates to torches for welding seams along curving surfaces.

The invention is intended primarily for butt-welding opposed end edges of pipe or tubular sections during relative movement of the torch and circumferential seam. The invention will be described in connection with such welding, but it is also useful for welding sheet or plate metal parts generally, along curving edges or portions, when such curving edges or portions are substantially of the same curvature so that they may be brought into contiguous relation, either edge to edge or overlapping, in accordance with the type of joint desired.

In making circumferential welds of the abutting edges of pipe or tube sections, where the pipe sections rotate under a torch located along the upper part of the seam, I have found it advantageous to regulate the heating stages so that the fused metal will become plastic, or congeal, in time to effect the weld near the crest of the movement of the seam edges. In order to accomplish this the metal must be brought to fusion temperature before reaching the crest, and congelation must occur before the metal in its fluid condition passes so far beyond the crest that it will flow freely down the pipe walls. The tendency of the metal to flow by gravity can be used to produce a weld of a desired fullness or contour.

I have also found that to insure a weld of substantially homogeneous composition, in which the crystalline character of the weld does not vary abruptly, it is very advantageous that preheating of the metal occur at much greater distances from the seam edges than ordinarily thought advisable to bring the seam metal to fusion. An advantage of such preheating is the substantial absence of any demarcation between metal which has been molten during the fusing step and the other metal. To assist in obtaining this result, I have found it desirable to cut down by melting the ordinary straight-faced trough formed by the beveled edges to form a rounded trough.

An object of this invention is to provide a torch tip by which welding temperatures are created along the seam at the abutted end edges of pipe or tube members, while the seam moves past the tip at a predetermined speed, in a manner which produces substantially all of the desirable results obtained from manipulation of the heating jet by manual operation in which the jet is moved back and forth across the work to successively strike the metal at different points over a substantial area. In the preferred embodiment of the invention the tip is designed to conform closely to the contour of the circumferential seam operated upon to secure the maximum efficiency from the heating effects of the flame jets.

The formation of the face of the tip and the orifice drilling are such that the jets issuing from the orifices, or certain of them, will act to force their heated gases forwardly along the seam, and beyond the body of the tip to increase the effective distance of preheating without increase in tip length. Other orifices are disposed to direct their jets so as to concentrate their heating effect at the position where fusion is finally to take place. Such jets also function to force any molten metal that may form to travel along the seam in the direction of the jets. Since it is proposed to effect melting of metal on an upwardly traveling portion of the seam, such propulsion of the metal will tend to drive it to the crest of movement, there to take part in the final production of the weld. The jets are also arranged in such consecutive relation that the molten metal formed will be driven along the seam until it arrives at a predetermined position at which the jets will produce the effect of hand manipulation, spreading the metal laterally to give to the weld a finally desired flat, smooth finish or a curved reinforcement.

The operation of successive jets on the molten metal is such that by striking the surface of the metal at different points the jets actually effect a mechanical working of the metal which removes impurities.

The drilling of the orifices is also such that some of the jets will impinge directly upon metal widely removed laterally from the seam. A broad zone of hot metal will thus be erected, and conduction from the very hot molten metal to the comparatively very cold body metal will be reduced to a minimum.

Other objects, features, and advantages of the invention will appear or be pointed out as the specification proceeds.

In the accompanying drawings, forming a part hereof:

Fig. 1 is a side elevation of a torch tip made in accordance with this invention, located in position for welding a circumferential pipe seam;

Fig. 2 is a bottom plan view of the tip shown in Fig. 1;

Fig. 3 is an end elevational view of a tip as seen from the line 3—3 of Fig. 1; and Figs. 4 to 17, inclusive, are vertical transverse sectional views on the lines 4—4 to 17—17, inclusive, respectively, of Fig. 1.

In Fig. 1, the tip 10 is shown disposed above the end of a pipe section 12, the opposed pipe section not appearing in this view. Portions of the two pipe sections, both marked 12, are shown in Figs. 4–17. The unwelded seam is of the trough type, formed by bevel faces, at the bottom of which are small vertical faces. The orifice face 13 of the torch tip, at least in part, follows closely the contour of the seam and in this instance the circumferential contour of the pipe sections. It is customary that the tip remain stationary, while the sections, preliminarily tacked together, rotate past the jets issuing from the tip.

In the body of the tip are longitudinal header passages 14, from which the orifices in the face 13 are to be fed a mixture of oxygen and acetylene. Another pair of passages 15 provide means for conducting cooling water supplied by conduits 16 through the body. A diagonal duct 17 is formed through the body to conduct a wire 18 to supply added metal to be melted into the seam.

It will be necessary to consider each individual flame jet orifice or pairs of orifices, since the functions of the jets differ. As shown in Fig. 4, the jets 19, issuing from the laterally divergent orifices 20, at the forward end of the torch are disposed to attack the metal of the pipe sections at a considerable distance away from the junction edge of the surface 21 of the section and the beveled face 22.

These jets meet surface 21 at an angle, directed outwardly, so that the hot gases of the jets will be swept over the surface away from the seam and will heat the parts widely. The jets are located immediately above the upwardly moving portion of the seam and at a substantial distance below the crest of movement. Their angle of incidence upon surface 21 results in a flow of the hot gases downwardly along the curving section wall faces, increasing the amount of metal preheated. By thus increasing the distance at which preheat of the metal is effective, the length of tip 10 is kept within reasonable bounds while a large portion of the surface and the underlying metal are heated to some semblance of uniformity, which, in addition to its heat value, also reduces localized expansive and contractive effects upon the seam.

Jets 23 issuing from orifices 24 have substantially the same outward angular disposition as jets 19, but as shown in Fig. 1 these orifices are inclined longitudinally away from the orifices 20, so that the jets 23 are directed more nearly in a radial plane. Jets 25 from orifices 26 are disposed substantially in the same manner as jets 23, except that they have slightly less of the outward tendency. Jets 23 and 25, aided by the preliminary action of jets 19, increase the heat in the metal adjacent the seam edges 22.

Orifices 27 which deliver jets 28 are disposed in crossed relation to each other to drive the jet gases outwardly away from the seam. By disposing these jets in this manner, the sides of the jets are opposed to the face of the metal, so that, in addition to the heat absorbed by direct contact of the hot gases with the metal, the path of radiant heat from the jets to the faces is shortened.

This is also the case with the jets 29 which issue from crossing orifices 30. The disposition of these jets and orifices is substantially the same as that of jets 28 and orifices 27, except that the points of impingement upon the surface are closer to the junction edges of the seam. These jets constitute the last units in the preheating system for bringing the metal to fusing temperature.

Jets 31 issuing from orifices 32 constitute the first set of active means intended to fuse metal. These jets are disposed to strike directly in the trough between the sections. By the time these jets become effective, the temperature of the metal will have become such that a breakdown or melting of the trough faces will commence, so that when these faces pass on to the action of jets 33 issuing from orifices 34 considerable melting will be in progress.

As seen in Figs. 9 and 10, the relative angular disposition within each group of jets 31 and 32 is different, jets 32 being more nearly parallel than jets 31, and the separation of the jets 32 consequently being materially greater so that the heating effect is moved upwardly and outwardly from the bottom of the trough to break down the upper portions of the walls of the V. The effect of the jets 31 is very useful, since melting metal at the bottom of the groove is more difficult than other portions of the weld to be produced. These jets and the subsequent jets produce the desired rounding of the trough.

The succeeding pairs of jets 35 and 37 delivered from orifices 36 and 38 are converged again toward the bottom of the groove. These jets serve to keep molten such metal as has already been melted and has collected in the bottom of the groove. Their deflected gases and their radiant heat also melt down more of the metal of the sides of the trough.

It is also to be noted that jets 33, 35 and 37 are disposed to direct their gases in the direction in which the seam is moving past tip 10. The metal melted by these jets will, by the pressure of the gases, be forced to move forwardly along the seam and be retained against moving backward down the incline of the pipe walls. As the seam moves toward the crest of its rotation, such metal will be driven into the puddle 39, forming just beyond these jets.

Jets 40 issuing from orifices 41 continue the work of jets 35 and 37, their inward inclination being less so that they attack the metal further removed from the center of the seam than do jets 35 and 37. This changing of the relative positions of impingement of the several jets with relation to the center line of the seam results in a movement of the molten metal and a heating of the general mass of metal in a manner similar to that accomplished by one manipulating a hand torch, proper melting of the sides of the groove, as well as fusion at the bottom of the groove, being produced.

As illustrated in Figs. 10, 11, 12 and 13, during the action of the respective jets, while the puddle of molten metal 42 is retained in position by the jets, metal 43 is continuously solidifying to build up the final welded joint. To make up for metal loss and build up the weld, wire 18 is fed through duct 17. To bring this wire to melting temperature before it contacts with the molten metal at the seam, and simultaneously to assist in retaining the molten metal at the seam in fused condition, is the purpose of jets 44 delivered by orifices 45. As shown in Fig. 14, these jets impinge upon and "wipe" the side faces of the wire, so that it will be subjected to the direct and radiant heat of both jets. At the same time, owing to the sharp convergence of these jets, they affect the molten metal in the seam groove by spreading their heat laterally to insure wider distribution of heat and some spreading of the molten metal at the time the wire metal is being introduced. A single jet, directed forward from orifice 46, acts directly upon the wire and melts it down into the seam.

At the next set of orifices 47 the direction of jets 48 changes from the extreme convergence of jets 44, and the jets 48 act directly upon the molten metal in the seam, their effect by their transverse spacing being to assist in the complete interfusion of the wire metal with the rest of the metal in the groove. These jets are disposed practically in a radial plane, so that little or no unbalanced longitudinal disturbance of the molten metal will occur. These jets are intended to attack the molten metal immediately at, just before, or just after the crest of movement of the seam edges. The determining factors in this case would arise with each separate situation, suitable adjusting means for positioning the torch tip as a unit being provided. Among these factors are the relative speed of movement of the seam past the tip, the number of jets utilized to bring the metal to fusion before this position, and the thickness of the pipe walls.

Since, as is well known, the action of the flame jets has been to force the metal into a ridge or hump, which in many cases is undesirable, jets 49 are directed from orifices 50 and, as seen in Fig. 16, act against each other, so that as they impinge directly upon the central ridge built up by the previous jets they will tend to spread such metal outwardly, thus in effect flattening the metal to produce the smooth formation shown in Fig. 17. The fillets between the melted and the unmelted metal are gradual, so that the weld does not suffer from sharp corners or other weakening influences. Also, these jets retain the metal in molten condition for a sufficient period, so that the puddle 42 extends slightly beyond the crest of movement onto the downgoing side of the pipe, so that by proper regulation of speed and the position of the tip relative to the crest the fullness of the finally solidified metal will be predetermined.

The spacing between jets 49 and the final single jet 51 from orifice 52 is such that the molten metal will have had the opportunity to congeal practically entirely, the effect of jet 51 being to delay the complete cooling and rigidification of the metal, so that slower crystalization will result, and greater strength in the metal. Also, this jet will tend to effect a final molding of the weld.

This application is a division of my application Serial No. 554,459, filed August 1, 1931 (Patent No. 1,972,509, dated September 4, 1934).

The preferred embodiment of the invention has been illustrated and described but changes in the number of orifices and other modifications can be made, and various features of the invention can be used alone or in combination with other features without departing from the invention as defined in the appended claims.

I claim:

1. A torch for welding a seam by relative movement of the torch and seam, the torch having a face and a plurality of jet orifices in the face for directing flames against the work, succcessive jet orifices lengthwise of the torch face being disposed to direct the flames to strike the metal at different points, the successive jets being first progressively closer to the center line of the seam, then further from said center line and from each other, and then progressively closer again whereby the heat is applied to the metal with the same effect as by moving a single jet transversely of the seam as the seam moves longitudinally with respect to the single jet.

2. A tip for circumferentially welding pipe sections positioned in end to end relation, said ends being formed so that when in abutting relation a substantial groove is presented thereby, which comprises: a body having a face with a plurality of jet orifices opening therefrom and arranged in a series, the first group of orifices being so disposed that flame jets issuing therefrom are directed downward on opposite sides of but close to the region under the center line of the torch face so that the jets impinge upon the walls of the pipe sections in close relation to the ends, succeeding orifices disposed to direct jets further from the center region so that the jets therefrom direct heat outwardly along the pipe walls away from the section ends beyond the portions affected by the preceding jets, and succeeding orifices disposed to project jets at said center region to attack directly the walls of the groove.

3. A tip for circumferentially welding pipe sections positioned in end to end relation, said ends being formed so that when in abutting relation a substantial groove is presented thereby, which comprises: a body having a face with a plurality of jet orifices opening therefrom and arranged in a series, the first group of orifices being so disposed that flame jets issuing therefrom are directed downward on opposite sides of but close to the region under the center line of the torch face so that the jets impinge upon the walls of the pipe sections in close relation to the ends, succeeding orifices disposed to direct jets further from the center region so that the jets therefrom direct heat outwardly along the pipe walls away from the section ends beyond the portions affected by the preceding jets, and succeeding orifices disposed at slightly different angles to project jets at said center region to attack the walls of said groove and the intersection of the groove wall and the outer surface of the pipe section and the intermediate areas in graduated and successive relation.

4. A torch for welding circumferential seams formed by the abutting ends of pipe sections as the circumferential seam rotates with respect to the torch, said torch having a curved face with jet orifices opening through the face at spaced points along the length of the face for directing a seamwise extending system of flame jets against the seam below the torch, some of the orifices being disposed so that they slope downwardly and toward the rearward end of the torch at acute angles to the face of the torch, and adapted to cause the flame jets which they direct against the seam to force the molten metal of the seam to move with respect to the pipe sections, and up the incline of the circumferential seam, in the direction in which the seam moves with respect to the torch.

5. A torch for welding circumferential seams formed by the abutting ends of pipe sections as the circumferential seam rotates with respect to the torch, said torch having a curved face with jet orifices opening through the face at spaced points along the length of the face for directing a seamwise extending system of flame jets against the seam, some of the orifices being disposed at acute angles to the torch face, and sloping downwardly and toward the rearward end of the torch, and adapted to cause the flame jets directed against the seam by said sloping orifices to force the molten metal of the seam to move with respect to the pipe sections, and up the incline of the circumferential seam, in the direction in which the seam moves with respect to the torch, the successive orifices lengthwise of the torch face being disposed to direct the flame jets at different points laterally of the region underlying the face of the torch to cause the jets to strike the metal at different points transversely of the seam.

6. A tip for circumferentially welding pipe sections positioned in end to end relation, relative motion of the sections and the tip being effected, which comprises: a body having a face with a plurality of jet orifices opening therefrom, the orifices being so disposed that they direct flame jets at different angles, one pair of jet orifices near the front of the torch being disposed at such an inclination that flame jets issuing therefrom impinge upon the walls of the pipe sections under the torch at an angle to the radius of the pipe sections and are directed across the surface of the pipe sections in a direction substantially opposite to the direction of movement of the sections relative to the tip, said pair of flame jets being spaced away from the center line of the torch and disposed to strike the metal away from the ends of the sections, and succeeding pairs of jets disposed to direct flame jets more nearly downward toward a region under the center of the torch whereby the jets impinge upon the metal in successively closer relation to the ends of the pipe sections.

7. A tip for circumferentially welding pipe sections, positioned in end to end relation, relative motion of the sections and the tip being effected, which comprises: a body having a face with a plurality of jet orifices opening therefrom and arranged in series, the first group of orifices being so disposed that flame jets issuing therefrom impinge upon the walls of the pipe sections at an angle to the radius of the pipe sections and are directed across the surface of the pipe sections in a direction substantially opposite to the direction of movement of the sections relative to the tip and spaced away from the ends of the sections, the succeeding orifices being spaced and disposed to direct the jets into a region more nearly under the center line of the torch face so that the jets therefrom impinge upon the metal in successively closer relation to the ends of the pipe sections, and the orifices thereafter being directed outwardly away from the center line of the torch face so that the jets therefrom direct heat outwardly along the pipe walls away from the section ends beyond the portions affected by the preceding jets.

8. A torch for welding circumferential seams formed by the abutting ends of pipe sections, said torch having a face with one or more openings at its forward end in position to direct jets against the seam edges to preheat said edges, and successive openings for directing flame jets downward to weld the seam below the torch, the torch face being curved to properly space succeeding jet openings from the curved surface of the pipe, and at least one of the preheating jet openings at the forward end of the torch, and only the preheating jet openings, being directed forward at a substantial angle away from the radius of the curve of the torch face so that said preheating jet opening delivers a preheating jet over an area of the pipe in advance of the torch.

JAMES L. ANDERSON.